(12) United States Patent
Asada

(10) Patent No.: US 6,449,059 B1
(45) Date of Patent: Sep. 10, 2002

(54) INTERFACE DEVICE AND IMAGE FORMING APPARATUS

(75) Inventor: Kenichiroh Asada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/422,081

(22) Filed: Oct. 21, 1999

(30) Foreign Application Priority Data

Oct. 29, 1998 (JP) ............................................ 10-308971

(51) Int. Cl.$^7$ ................................................ G06A 15/00
(52) U.S. Cl. ..................................................... 358/1.2
(58) Field of Search .......................... 358/1.1, 1.2, 1.7, 358/1.16, 1.17, 528, 523, 451; 382/254, 258, 259, 267, 293, 298, 299, 305; 345/555, 562, 569

(56) References Cited

U.S. PATENT DOCUMENTS 5,109,437 A * 4/1992 Honda ........................ 358/433
5,464,290 A * 11/1995 Watanabe et al. ............ 358/1.2

FOREIGN PATENT DOCUMENTS

JP 5-183697 7/1993

* cited by examiner

*Primary Examiner*—Arthur G. Evans
(74) *Attorney, Agent, or Firm*—Oblon, Spivak, McClelland, Maier & Neustadt, P.C.

(57) ABSTRACT

In the controller I/F, the LSYNC thinning section converts the resolutions of the image data received from the printer section by thinning out a line-synchronizing signal /PMSYNCIN input from the printer section according to pre-set resolution and sends the signal to the external device as a thinned line-synchronizing signal /POPMSYNC. The input buffer once stores the image data transmitted from the external device in synchronism with /PILSYNC which is the same cycle as that of /POPMSYNC. When reading out the image data from the input buffer, identical data is repeatedly read out according to the set resolution. Even if the printer section receives an image data having a different resolution from the external device, there is no need to change the image-formation speed.

16 Claims, 7 Drawing Sheets

FIG.7

| ZOOM 2 | ZOOM 1 | ZOOM 0 | ZOOM RATIO (MAIN SCANNING× AUXILIARY SCANNING) | DENSITY OF INPUT DATA |
|---|---|---|---|---|
| 0 | 0 | 0 | 1×1 | 400dpi×400dpi |
| 0 | 0 | 1 | 1×2 | 400dpi×200dpi |
| 0 | 1 | 0 | 2×1 | 200dpi×400dpi |
| 0 | 1 | 1 | 2×2 | 200dpi×200dpi |
| 1 | 0 | 0 | 2×4 | 200dpi×100dpi |
| 1 | 0 | 1 | 4×2 | 100dpi×200dpi |
| 1 | 1 | 0 | 1×4 | 400dpi×100dpi |
| 1 | 1 | 1 | 4×1 | 100dpi×400dpi |

INTERFACE DEVICE AND IMAGE FORMING APPARATUS

FIELD OF THE INVENTION

The present invention relates to an interface device and an image forming apparatus. More particularly this invention relates, an interface which executes signal processing to image data transmitted from an external device and transmitting the data to a printer.

BACKGROUND OF THE INVENTION

In recent years, digital copier with an external device connected thereto, in addition to an ordinary use as a copier for receiving image data sent from the external device and outputting an image of the data It is needless to say that this copier also has all the functions provided in an ordinary copier.

For example, a printer controller and a FAX controller are used as an external device. When a FAX controller is connected to a digital copier, data with a resolution of 100 dpi to 400 dpi is sometimes transmitted from the FAX controller, or data with different resolution in main and auxiliary scanning directions is also sometimes transmitted therefrom.

When a printer controller is connected as an external device, data with a different resolution may be received in order to connect it to a plurality types of controller (in a case, for instance, where a digital copier is required to be compatible with an old type of controller).

As a conventional technology for supporting data with different resolutions, for instance, an image processor is disclosed in Japanese Patent Laid-Open Publication No. HEI 5-183697. In this image processor, a printer engine is connected to a printer controller for forming a visible image by using a rotatably driven drum. A PCPU first receives one of a plurality of different resolutions (300 dpi, 600 dpi) from the printer controller via a connection cable or from a switch circuit via a data line. Then the PCPU checks the resolution and sets the speed of the drum in such a manner that the speed will be ½ in case of 300 dpi as compared to the 600 dpi. The PCPU then performs smoothing processing corresponding to the determined resolutions according to a prespecified algorithm. Namely, this image processor allows an image in high recording density to be output without using a high-speed device by varying a linear speed of a photoconductive drum according to recording density of the external device.

However, the above mentioned image processor has difficulty in matching conditions of image formation with a plurality of linear-speed conditions because an image-formation speed of a printer section is changed, and has a problem of generating degradation in image quality especially in a case of a color engine.

SUMMARY OF THE INVENTION

This invention has been made in the light of the problems described above. It is an object of the present invention to provide an interface device and an image forming apparatus which allow image data with various resolutions sent from an external device to be printed with high quality without any change in an image-formation speed of its printer section.

In the interface device of this invention, a line-synchronizing signal thinning unit thins out a line-synchronizing signal transmitted from a printer section at a prespecified cycle according to set resolution and transmits the signal to an external device as a thinned line-synchronizing signal, a resolution setting unit sets resolution of image data, a storing unit stores therein image data transmitted from the external device at a cycle of the thinned line-synchronizing signal, a data converting unit repeatedly reads out an identical line and/or an identical pixel of the image data stored in the storing unit according to the set resolution and transmits the read out data to the printer section. Therefore, when image data with a different resolution from that of the printer section is transmitted from an external device, the need for changing the image-formation speed of the printer section is eliminated.

Other objects and features of this invention will become apparent from the following description with reference to the accompanying drawings.

BRIEF DESCRIPTION OF THE DRAWINGS

FIG. 7 shows a table used for setting resolutions.

DESCRIPTION OF THE PREFERRED EMBODIMENTS

Detailed description is made hereinafter for the preferred embodiments of the interface device and image forming apparatus according to present invention in order of outline of the invention, configuration of an image forming system, configuration of the controller I/F, and example of operations of the controller I/F with reference to the attached drawings.

Outline of the Invention

In any system having a printer section in a raster scanning system (e.g., a laser beam printer, an LED printer, a liquid-crystal printer) in which image data transmitted from an external device such as a scanner, a FAX unit, and a controller unit is received and an image is output, a line-synchronizing signal is sent from the printer section to the external device, and the external device transmits image data for each line in synchronism with this line-synchronizing signal.

The printer section employing this data synchronizing system prints and outputs image data each time when receiving the image data for one line from the external device, thus capacity of a memory to store image data therein can be made smaller.

When a FAX controller or a printer controller is connected to the printer section as an external device, for instance, resolution of this image data sent from the FAX or the printer controller may be different from that of the printer section. Therefore, the density of the image data has to be converted so as to match with that of the printer section.

The present invention provides a specific method of printing image data having various resolutions with high quality while maintaining the image-formation speed of the printer section constant, when an image data whose resolution is different from that of the printer section is transmitted from an external device to an interface device. This is achieved by changing the density of the image data in the interface device and transmitting this new image data to the printer section thereof.

Configuration of an Image Forming System

Figure 1:
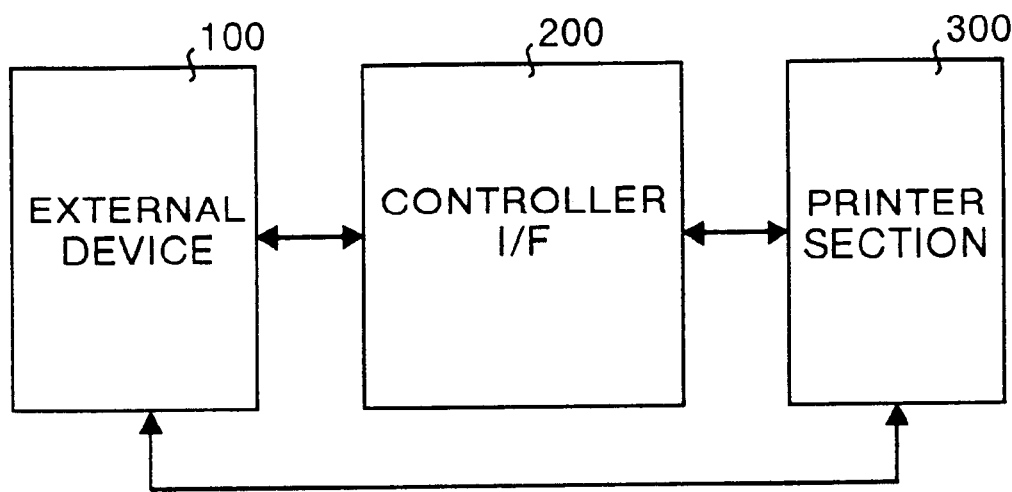
FIG. 1 is a block diagram showing configuration of an image forming system according to an embodiment.

FIG. 1 shows the entire configuration of an image forming system according to the embodiment of the present invention. As shown in this figure, the image forming system comprises an external device 100 which transmits image data to a controller I/F 200. This controller I/F 200 subjects the image data received from the external device 100 to signal processing (data conversion) and transmits the data to a printer section 300. This printer section 300 prints the image data received from the controller I/F 200. The controller I/F 200 and the printer section 300 constitutes the image forming apparatus. The printer section 300 employs an electronic photographing system in which a photoconductor is exposed and scanned by raster-scanning with a laser beam using a polygon mirror.

Configuration of the Controller I/F

Figure 2:
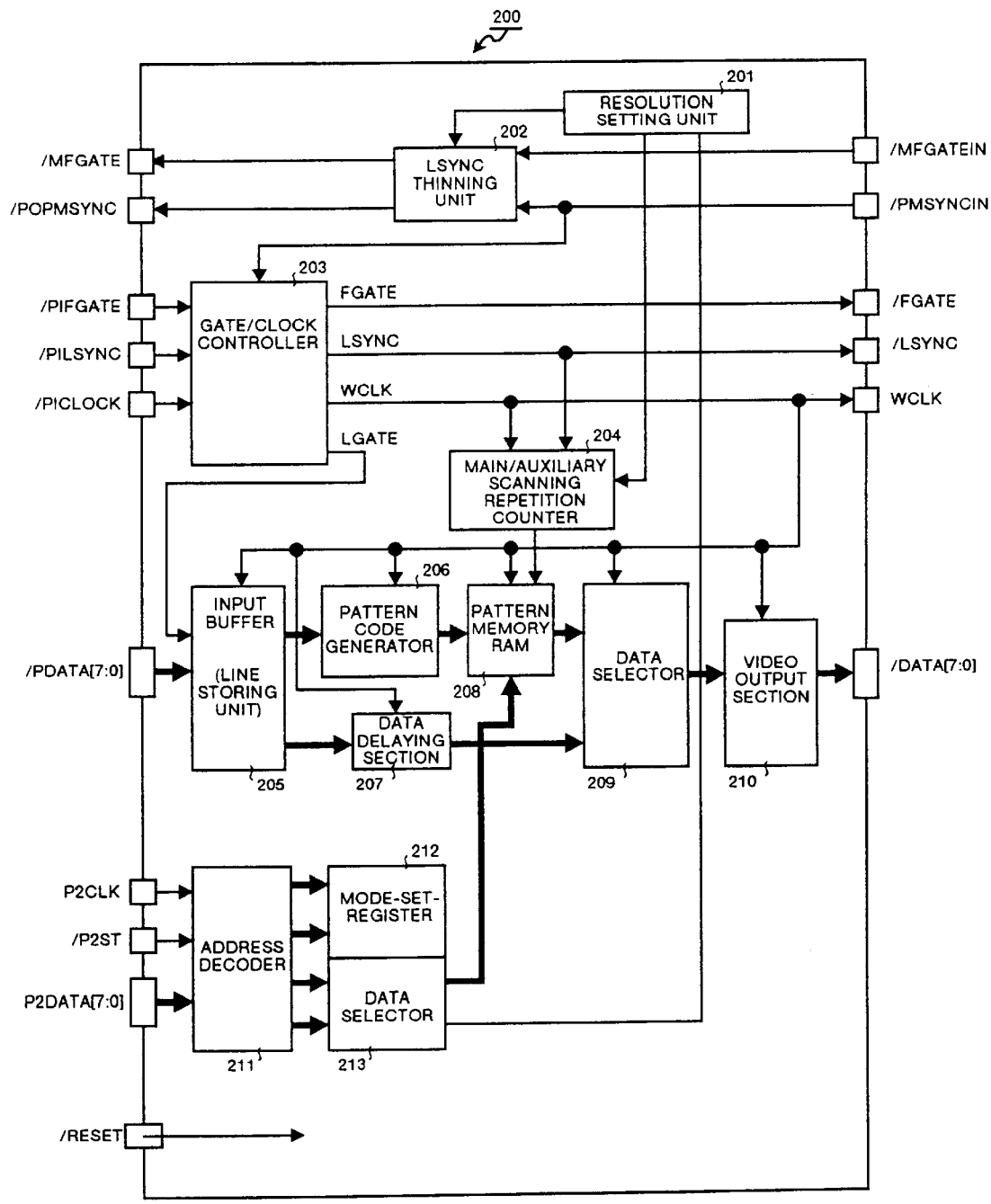
FIG. 2 shows the configuration of a controller I/F.

FIG. 2 shows an example of configuration of the controller I/F 200. The controller I/F 200 comprises, as shown in FIG. 2, a resolution setting section 201 for setting resolution (Zoom ratio), an LSYNC thinning section 202 for thinning out a line-synchronizing signal /PMYNCIN sent out from the printing section 35 at a prespecified cycle according to the resolution set in the resolution setting section 201 and transmitting the thinned line-synchronizing signal to the external device 100 as a thinned line-synchronizing signal /POPMSYNC, a gate /clock controller 203 for controlling an internal operation of the controller I/F 200, and a main/auxiliary scanning repetition counter 204 for counting a number of times of repeatedly reading out a scanning line (or lines) in the main scanning direction and/or in the auxiliary scanning direction when image data is to be read out from an input buffer 205 according to the resolution set in the resolution setting section 201.

The controller I/F 200 also comprises a input buffer (line storing unit) 205 for temporarily storing therein image data by line transmitted in synchronism with the thinned line-synchronizing signal /POPMSYNC from the external device 100, a pattern code generator 206 for generating pattern code to subject image data read from the input buffer 205 to smoothing correction, and a data delaying section 207 for delaying the image data read from the input buffer 205.

The controller I/F 200 further comprises a pattern memory RAM 208 for storing therein pattern code generated in the pattern code generator 206 as well as data subjected to smoothing correction corresponding to the number of times of repeatedly counting scanning lines in the main/auxiliary scanning repetition counter 204 and subjecting the input image data to shading correction, a data selector 209 for selecting image data input from the data delaying section 207 or the pattern memory RAM 208 and outputting the selected data, a video output section 210 for outputting image data input from the data selector 209 to the printer section 300, an address decoder 211, a mode-set register 212 with various modes (such as resolution (zoom ratio)) set therein, and a data selector 213 for performing settings within the controller I/F 200 according to the data set in the mode-set register 212.

The signals shown in FIG. 2 are explained below. /RESET is a signal for initializing registered contents of the mode flag register 212 as well as a portion of an output signal therefrom.

P2CLK is a system clock, which is a synchronizing signal when data is input from a system control section (not shown) of the printer section 300.

/P2ST is a strobe signal from the system control section (not shown) of the printer section 300.

/P2AD [7:0] is a signal from the system control section (not shown) of the printer section 300 used when read or write of a register or pattern data is executed from or in the pattern memory RAM 208 or the mode flag register 212.

/MFGATEIN is a signal indicating a line-synchronized position in the auxiliary scanning direction input from the printer section 300.

/PMSYNCIN is a signal indicating a line-synchronized position in the main scanning direction input from the printer section 300.

/MFGATE is an output signal indicating an outline of a paper in the auxiliary scanning direction to be output to the external device 100 and is synchronized to /PMSYNCIN.

/POPMSYNC is an output signal indicating a line-synchronized position in the main scanning direction to be output to the external device 100, which is a signal with /PMSYNCIN thinned out according to the set zoom ratio (resolution).

/PIFGATE is an input signal indicating an outline of a paper in the auxiliary scanning direction input from the external device 100.

/PILSYNC is an input signal indicating a line-synchronized position in the main scanning direction input from the external device 100.

/PICLK is a clock input signal in synchronism with image data input from the external device 100.

PDATA [7:0] is a multi-value image data input signal input from the external device 100. Herein [7:0] indicates 8-bit image data.

/FGATE is an output signal indicating an outline of a paper in the auxiliary scanning direction to be output to the printer section 300 and is synchronized to /LSYNC.

/LSYNC is an output signal indicating a line-synchronized position in the main scanning direction to be output to the printer section 300.

WCLK is a clock output signal in synchronism with image data /DATA [7:0] to be output to the printer section 300.

/DATA [7:0] is a multi-value image data output signal to be output to the printer section 300.

Example of Operation of the Controller I/F

Figure 3:
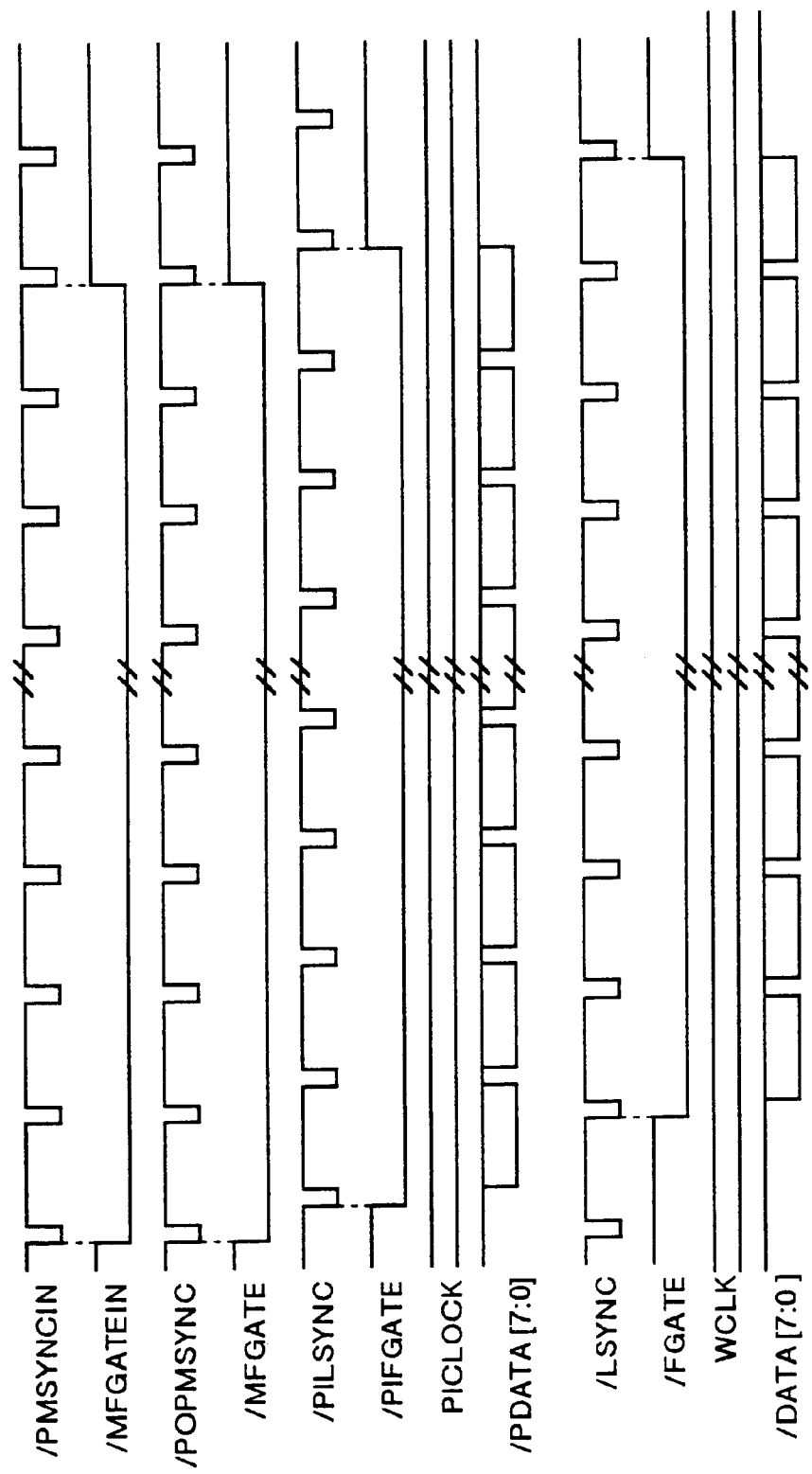
FIG. 3 is a timing chart explaining an operation of the controller I/F (in a case of the equivalent zoom)
Figure 4:
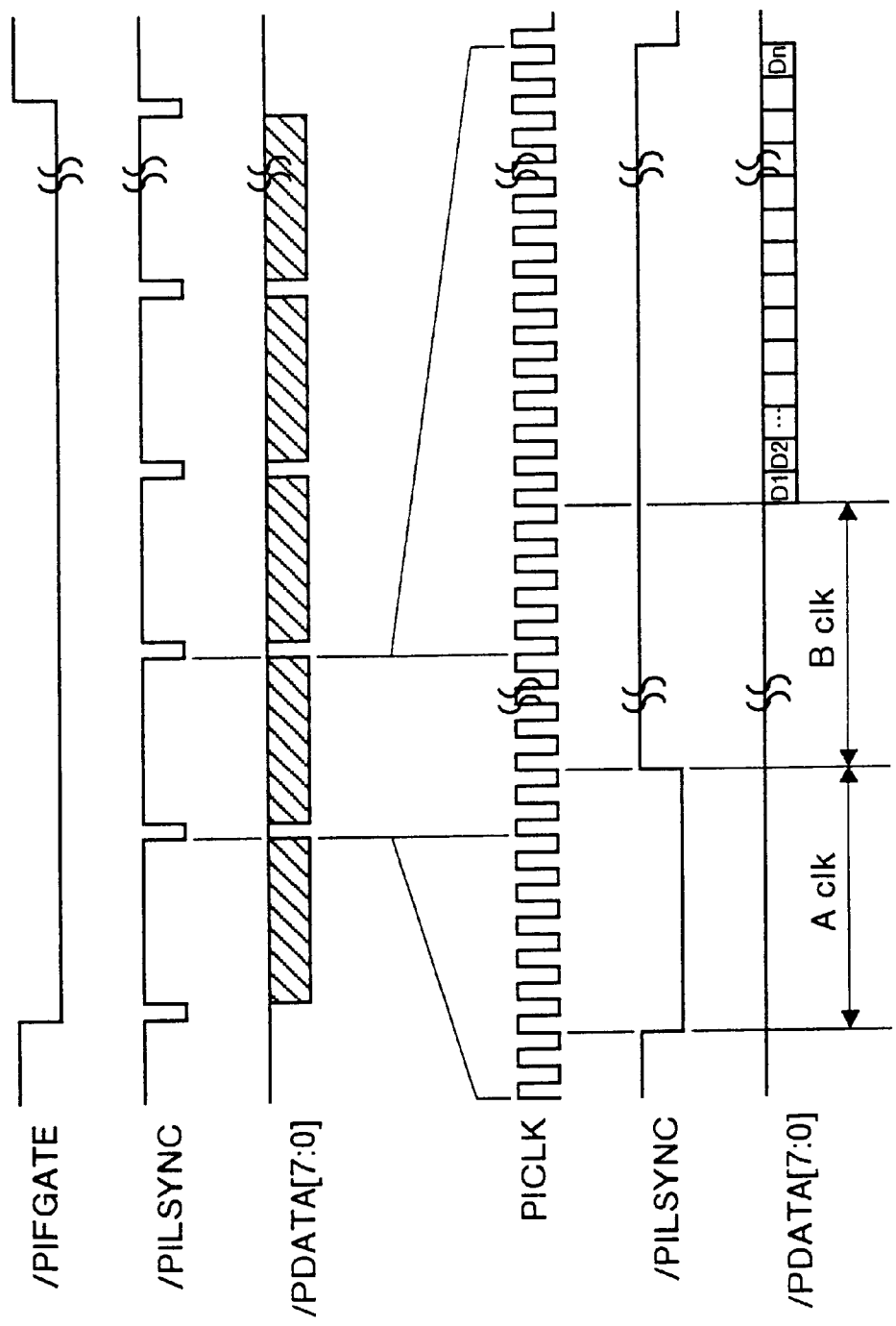
FIG. 4 is a partially enlarged timing chart of the timing chart in FIG. 3.
Figure 5:
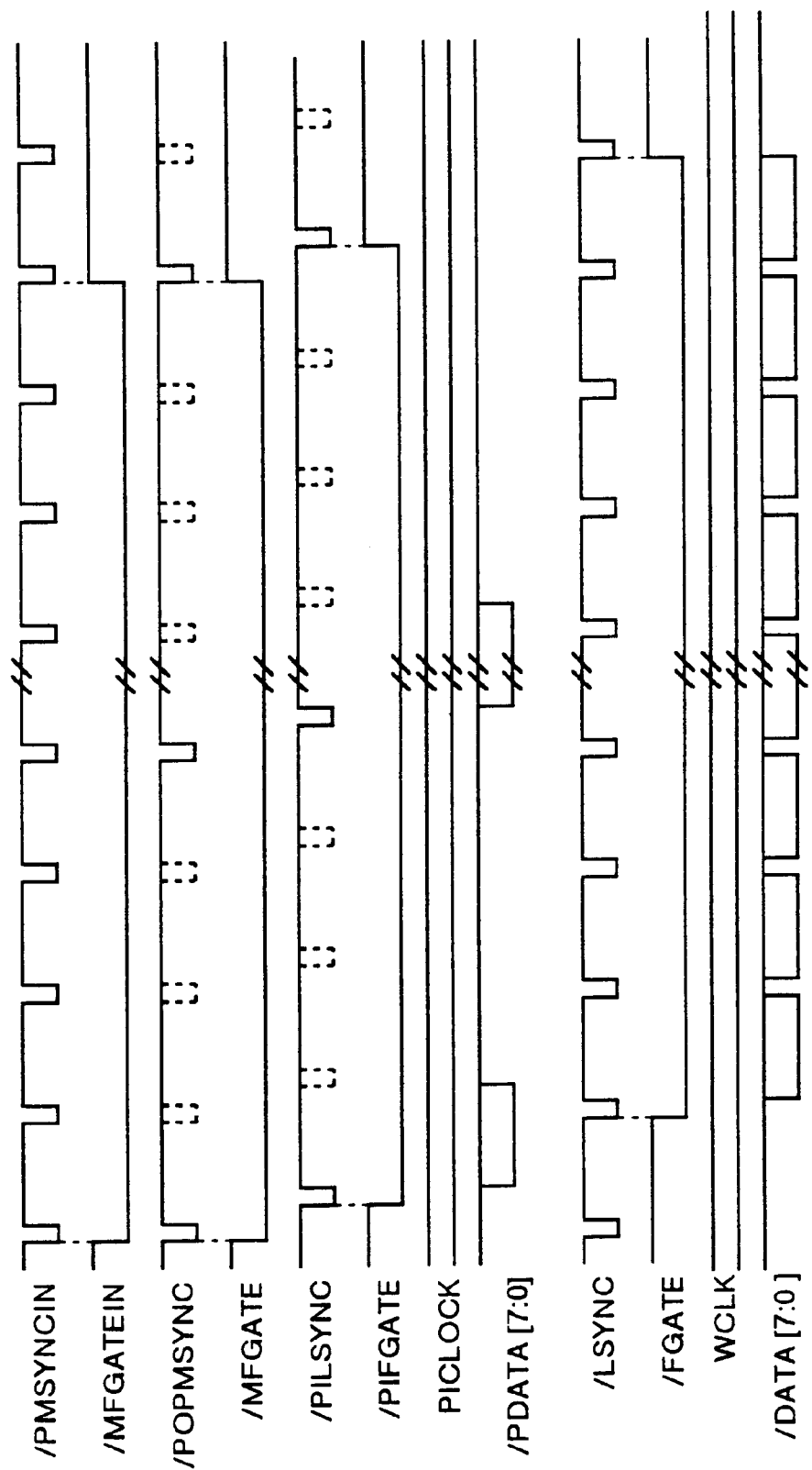
FIG. 5 is a timing chart explaining an operation of the controller I/F (when an image is zoomed four times in the auxiliary scanning direction)
Figure 6:
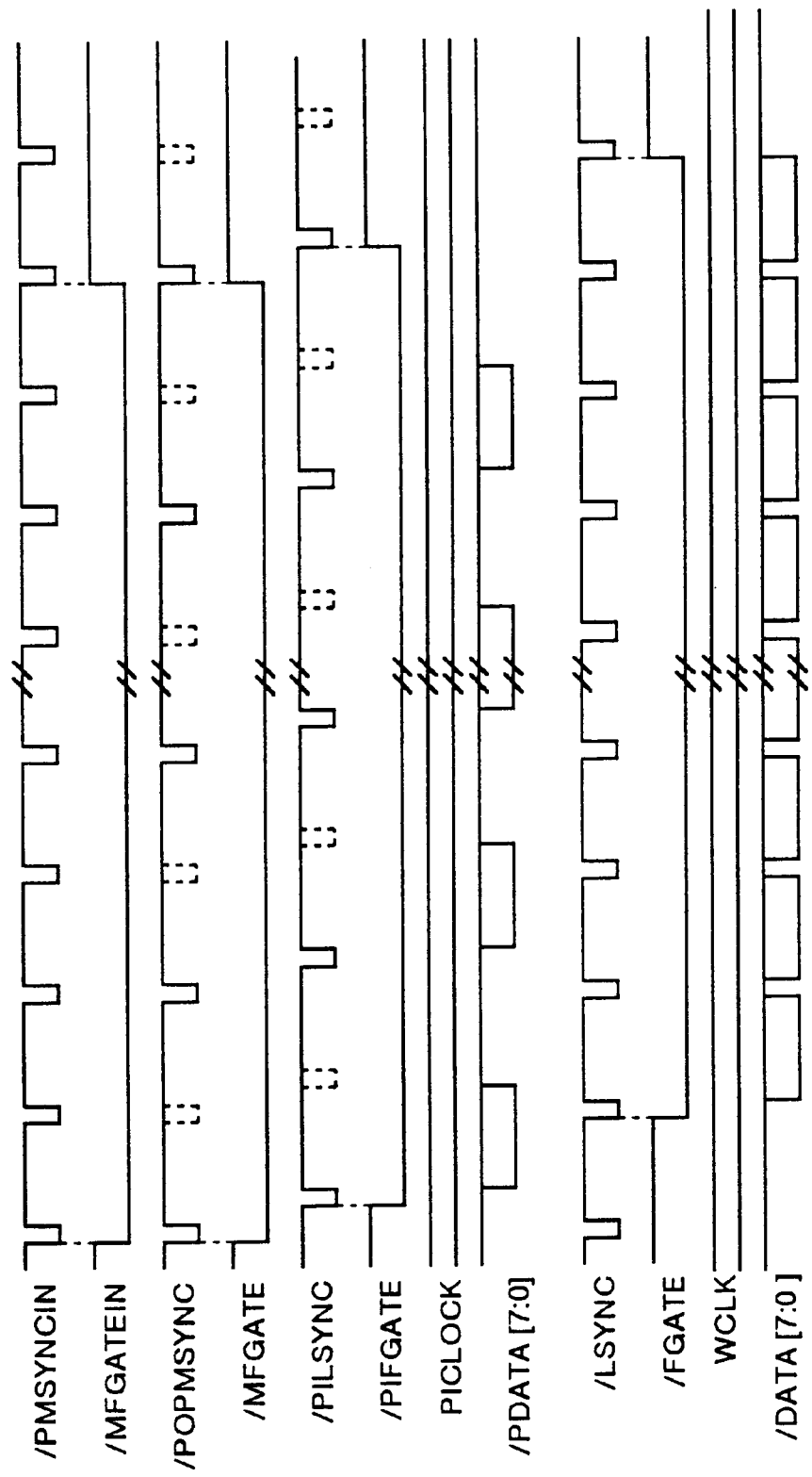
FIG. 6 is a timing chart explaining an operation of the controller I/F (when an image is zoomed twice in the auxiliary scanning direction)

Operations of the controller I/F 200 will be explained in order of 1) operation when enlargement processing is not executed (in the equivalent zoom) and 2) an operation when enlargement processing is executed (in the zoom-in) with reference to FIG. 3 to FIG. 7. FIG. 3 to FIG. 6 show timing charts each for explaining a timing when image data is transmitted from an external device 100 to the printer section 300 via the controller I/F 200. Specifically, FIG. 3 shows a timing when the image is not enlarged (in the equivalent zoom), FIG. 4 shows a timing when FIG. 3 is partially enlarged, FIG. 5 shows a timing when the image is zoomed four times in the auxiliary scanning direction, and FIG. 6 shows a timing when the image is zoomed twice in the auxiliary scanning direction.

1) Operation when Enlargement Processing is not Executed (Equivalent Zoom)

Operations of the controller I/F 200 shown in FIG. 2 is described when resolution in the auxiliary scanning direction of the external device 100 is the same as that of the printer section 300, namely, when an image is not enlarged (equivalent zoom) with reference to the timing charts shown in FIG. 3 and FIG. 4.

At first, the printer section 300 synchronously detects scanning of a laser beam with a synchronous detecting element, outputs a line-synchronizing signal /PMSYNCIN to the controller I/F 200 for each line, and also outputs an image-output permission signal /MFGATEIN to the controller I/F 200 (Refer to FIG. 3).

In the controller I/F 200, the line-synchronizing signal /PMYNCIN and the image-output permission signal /MFGATEIN are input into the LSYNC thinning section 202. Then, since the resolutions in the auxiliary scanning direction of the external device 100 and printer section 300 are the same (e.g., both of the resolutions are 600 dpi), the equivalent zoom is set in the resolution setting section 201. The LSYNC thinning section 202 outputs the line-synchronizing signal /PMSYNCIN to the external device 100 as /POPMSYNC without being thinned out according to the resolution set in the resolution setting section 201. The LSYNC thinning section 202 also outputs the input image-output permission signal /MFGATEIN to the external device 100 as /MFGATE as it is.

As described above, the image-output permission signal /MFGATEIN is used for obtaining a synchronization with /POPMSYNC. Namely, the image-output permission signal /MFGATEIN is used for correcting displacement of a timing occurring when /PMSYNCIN is thinned out.

On the other hand, the external device 100 generates /PIFGATE and /PILSYNC signals with /POPMSYNC and /MFGATE both input from the controller I/F 200 as a reference inconsideration of skew of the signals, and outputs the signals to the controller I/F 200. The external device 100 also generates a transfer clock signal PICLOCK and outputs this signal to the controller I/F 200.

In that process, the external device 100 transmits image data /PDATA [7:0] to the controller I/F 200 in synchronism with the /PIFGATE, /PILSYNC signals and the transfer clock signal PICLOCK (Refer to FIG. 4).

In the controller I/F 200, the /PIFGATE, /PILSYNC signals and the transfer clock signal PICLOCK are input into the gate/clock controller 203, and the image data /PDATA [7:0] is input into the input buffer 205 line by line.

The gate/clock controller 203 generates signals /FGATE, /LSYNC, WCLK, and LGATE. Of these signals, /FGATE is output to the printer section 300, and /LSYNC is output to the printer section 300 and the main/auxiliary scanning repetition counter 204. Signal WCLK is output to the printer section 300, main/auxiliary scanning repetition counter 204, input buffer 205, pattern code generator 206, data delaying section 207, pattern memory RAM 208, data selector 209, and video output section 210. Signal GATE is output to the input buffer 205.

The image data /PDATA [7:0] is temporarily stored in the input buf er 205 line by line. This image data is read out into the pattern code generator 206 by the gate/clock controller 203. A code pattern including an information whether the image is a target for smoothing or not is generated in the pattern code generator 206. The image dots determined as a target for smoothing are subjected to smoothing processing by accessing data for smoothing in the pattern memory RAM 208 using the generated code as an address, and the smoothing-processed image data is output to the data selector 209.

On the other hand, the image dots that are not the target for smoothing are output to the data delaying section 207, timing with that of the image dots to be subjected to smoothing processing is adjusted, and output to the data selector 209. Namely, when the image dots are not the target for smoothing then the input image data is output as it is.

The data selector 209 selects image data after subjected to smoothing processing input from the pattern memory RAM 208 or through-image data which is not subjected to smoothing processing input from the data delaying section 207, and outputs image data /DATA [7:0] to the printer section 300 via the video output section 210 in synchronism with signals /LSYNC, /FGATE, and WCLK.

Setting of resolutions in the controller I/F 200 and setting of parameters such as data for smoothing processing are performed by the printer section 300. More specifically, setting information is sent from the external device 100 to the system control section (not shown) for controlling the printer section 300. In accordance with the operation above, the system control section sets data in the mode-set register 212 according to signals /P2ST, P2CLK, and P2DATA [7:0] input via the address decoder 211 of the controller I/F 200. Then, the data selector 213 sets resolution of the resolution setting section 201 and data for smoothing of the pattern memory RAM 208 according to the data set in the mode-set register 212.

2) Operation when Enlargement Processing is Executed (Zoom-in)

Operations of the controller I/F 200 shown in FIG. 2 when resolution of the external device 100 is different from that of the printer section 300, namely, when an image is zoomed will be explained with reference to the timing charts shown in FIG. 5 and FIG. 6. It should be noted that description of the sections in common with the operations when the enlargement processing is not executed is omitted herein.

A case where a FAX module as an external device 100 is connected to the printer section 300 will be described herein as an example. In the FAX module, the resolution of an image is changed in a range from 100 dpi to 200 dpi according to performance of a target FAX. A case where resolution of the printer section 300 is 400 dpi and resolution of the image data obtained from the FAX in the auxiliary scanning direction is 100 dpi will be taken as an example.

In this case, when image data is transmitted from the FAX each time in synchronism with a line in the printer section 300, the image is resultantly reduced to ¼ of the resolution. Therefore, the controller I/F 200 thins out a line-synchronizing signal /PMSYNCIN input from the printer section 300 according to its resolution, and sends out the signal to the external device 100 as a thinned line-synchronizing signal /POPMSYNC. Then, the controller I/F 200 stores the image data transmitted from the external device 100 in synchronism with a signal /PILSYNC having the same cycle as that of the /POPMSYNC in the input buffer 205 once, and converts the resolution to another one when reading out the image data from the input buffer 205 by repeatedly reading the same data according to the set zoom ratio.

Operation of the controller I/F 200 when an image is zoomed four times in the auxiliary scanning direction is specifically explained with reference to the timing chart in FIG. 5. The system control section (not shown) of the printer section 300 sets n=4 in the LSYNC thinning section 202 via the address decoder 211, mode-set register 212, and resolution setting section 201 of the controller I/F 200 according to resolution information (100 dpi) input from the external device 100.

The LSYNC thinning section 202 thins out a line-synchronizing signal /PMSYNCIN input from the printer section 300 to ¼ and sends the signal to the external device 100 as a thinned line-synchronizing signal /POPMSYNC (Refer to FIG. 5A). The period of signal /POPMSYNC is four times longer than the period of the line-synchronizing signal /PMSYNCIN.

The external device 100 sends out image data /PDATA [7:0] to the controller I/F 200 in synchronism with /PILSYNC having the same period as that of /POPMSYNC.

The image data /PDATA [7:0] input from the external device 100 is stored in the input buffer 205 at a cycle of one line in four times of /PMSYNCIN. An identical line in the image data stored in the input buffer 205 is repeatedly read out four times at the cycle of the line-synchronizing signal /PMSYNCIN. Thus, it is possible to convert the zoom ratio by four times in the auxiliary scanning direction.

A code pattern including an information regarding whether the image is a target for smoothing or not is generated in the pattern code generator 206. On the other hand, the image dots which are not the target for smoothing are output to the data delaying section 207, timing with that of the image dots to be subjected to smoothing processing is adjusted, and output to the data selector 209. Namely, when the image dots are not the target for smoothing then the input image data is output as it is.

When the identical dot is simply repeated for reading out image data, 100 dpi/1-dot jaggy is also zoomed in four times as it is. Therefore, in order to effectively correct the jaggies of image data as a target for smoothing in the embodiment, smoothing processing is executed while a zoom is performed.

More specifically, the main/auxiliary scanning repetition counter 204 counts a number of times of repeatedly reading out image data stored in the input buffer 205 in the auxiliary scanning direction. In this example, a repetition counter in the auxiliary scanning direction consists of 2 bits and counts up a number of times of repeatedly reading the data. By allocating different smoothing data to image data to repeatedly be read out by using the counted value when getting access to the pattern memory RAM 208, optimal smoothing processing is performed even when the image is zoomed. Further more specifically, the repetition counter accesses smoothing data by inputting the above mentioned pattern code with the counted value as an address for entry to the pattern memory RAM 208, subjects the image to smoothing processing, and outputs the smoothing-processed image data to the data selector 209.

The data selector 209 selects the smoothed image data input from the pattern memory RAM 208 or through-image data that is not subjected to smoothing processing input from the data delaying section 207, and outputs image data /DATA [7:0] to the printer section 300 via the video output section 210 in synchronism with signals /LSYNC, /FGATE, and WCLK.

Although the description above has assumed the case where the resolution in the auxiliary scanning direction of image data from FAX is 100 dpi, when resolution in the auxiliary scanning direction of image data from FAX is 200 dpi, the resolution of the image data is converted through the processing at the timing shown in FIG. 6.

More specifically, n is set to 2 in the LSYNC thinning section 202. The LSYNC thinning section 202 thins out the input line-synchronizing signal /PMSYNCIN to ½ and sends the signal to the external device 100 as a thinned line-synchronizing signal /POPMSYNC (Refer to FIG. 6). The input buffer 205 then stores therein image data /PDATA [7:0] input from the external device 100 at a cycle of one line for every two of /PMSYNCIN. An identical line of the image data stored in the input buffer 205 may repeatedly be read out twice at the cycle of the line-synchronizing signal /PMSYNCIN.

Further, although the case of the zoom (enlargement) in the auxiliary scanning direction has been explained, the controller I/F 200 can zoom the main scanning direction. More specifically, when the main scanning direction is to be zoomed (enlarged), the zoom is realized by repeatedly reading out data of an identical pixel in the image data stored in the input buffer 205 in the main scanning direction. In this case, by managing a repetition-counted value in the main scanning direction by the main/auxiliary scanning repetition counter 204, different smoothing data can also be allocated to repeated output of image data of the identical pixel, thus optimal smoothing processing being executed even when the main scanning direction is zoomed.

Further, by discretely setting each zoom in the main scanning direction and auxiliary scanning direction, the present invention can be suitably used with more of image data having different resolutions in the main and auxiliary scanning directions.

In addition, 100 dpi or 200 dpi-FAX image data input into the 400 dpi-printer section 300 can be zoomed. In this case, preparation is previously made so that any register can be set in the mode-set register 212 by using a 2-bit ZOOM parameter as the table shown in FIG. 7, and a number of times of repeatedly reading out a main scanning line, a number of lines of a line-synchronizing signal /PMSYNCIN to be thinned-out, and a number of times of repeatedly reading out an auxiliary scanning line may be set therein with a ZOOM value. More specifically, registers of ZOOM 1, ZOOM 2, and ZOOM 3 are provided in the mode-set register 212, and then a number of times of repeatedly reading out a main scanning line, a number of lines of a line-synchronizing signal /PMSYNCIN to be thinned-out, and a number of times of repeatedly reading out an auxiliary scanning line may be set therein according to each value written in the registers of ZOOM 1, ZOOM 2, and ZOOM 3.

For instance, when data "000" is written in the registers of ZOOM 1, ZOOM 2, and ZOOM 3 by the printer section 300, in order to execute equivalent-zoom (1×1) processing, n=1 may be set in the LSYNC thinning section 202 and a number of times of repeatedly counting an auxiliary scanning line may be set to 1 in the main/auxiliary scanning repetition counter 204. When data "001" is written in the registers of ZOOM 1, ZOOM 2, and ZOOM 3 by the printer section 300, in order to execute zoom (1 (main scanning line)×2 (auxiliary scanning line)) processing, n=2 may be set in the LSYNC thinning section 202 and a number of times of repeatedly counting an auxiliary scanning line may be set to 2 in the main/auxiliary scanning repetition counter 204.

Although a case has been explained in the above embodiment in which an image data with low-resolution (in the main scanning direction or in the auxiliary scanning direction) obtained from the external device 100 is converted to resolution of the printer section 300, the present invention is not limited to the embodiment, thus being used also for zooming input image data. For instance, when resolution of the image data of the external device 100 is 400 dpi and resolution of the printer section 300 is also 400 dpi, a method of thinning out /PMSYNCIN in the proportions of 1 line to two lines, what is called mode "enlarged twice in the auxiliary scanning line" is set, and an image to be output from the printer section 300 can also be made twice in the auxiliary scanning direction.

Although the description has assumed the case where a FAX is used as an external device in the above mentioned embodiment, the present invention is not limited to the embodiment, thus being applicable also to a case where a printer controller or a personal computer is used as an external device.

As described above, in this embodiment, in the controller I/F 200, conversion of resolutions is performed by thinning out a line-synchronizing signal /PMSYNCIN input from the printer section 300 in the LSYNC thinning section 202 according to set resolution (zoom ratio), sending out the signal to the external device 100 as a thinned line-synchronizing signal /POPMSYNC, storing therein image data transmitted from the external device 100 once in the input buffer 205 in synchronism with signal /PILSYNC which is the same cycle as that of signal /POPMSYNC, and repeatedly reading out, when the gate/clock controller 203 reads out image data from the input buffer 205, identical data (repeatedly reading out an identical line in the zoom in the auxiliary scanning direction, and an identical pixel in the zoom in the main scanning direction) according to the resolution (zoom ratio). Thus, the need for changing the image-formation speed of the printer section 300 is eliminated. Therefore, degradation in image quality due to changes in density or the like derived from switching of the image-formation speed be prevented.

Further, in this embodiment the smoothing data is accessed by using pattern code generated in the pattern code generator 206 with a counted value by the main/auxiliary scanning repetition counter 204 as an address for entry to the pattern memory RAM 208, and smoothing processing is executed. Therefore, jaggies can effectively be corrected.

Further, in this embodiment, the resolution setting section 201 can discretely set each degree of zoom in the main scanning direction and in the auxiliary scanning direction. Therefore, it is possible to convert resolutions of image data which has different resolutions in the main scanning direction and in the auxiliary scanning direction to resolutions of the printer section 300.

Further, in this embodiment, the resolution setting section 201 can selectively set resolution (a zoom number) out of a plurality types of setting. Therefore, it is possible to use image data having various resolutions sent from an external device.

Further, in this embodiment, the LSYNC thinning section 202 thins out the line-synchronizing signal /PMSYNCIN to 1/n when resolution in the auxiliary scanning direction of image data transmitted from the external device 100 is 1/n of the resolution of the printer section 300, and transmits the signal to the external device 100 as a thinned line-synchronizing signal /POPMSYNC. Therefore, it is possible to easily change resolution in the auxiliary scanning direction.

Further, in this embodiment, resolution of the resolution setting section 201 is set according to a command transmitted from the printer section 300. Therefore, a user does not have to change the resolution each time, which allows work and time for operations to be reduced.

According to the interface device of this invention, the line-synchronizing signal thinning unit thins out a line-synchronizing signal transmitted from a printer section at a prespecified cycle according to set resolution and transmits the signal to an external device as a thinned line-synchronizing signal, the resolution setting unit sets resolution of image data, the storing unit stores therein image data transmitted from the external device at a cycle of the thinned line-synchronizing signal, the data converting unit repeatedly reads out an identical line and/or an identical pixel of the image data stored in the storing unit according to the set resolution and transmits the read out data to the printer section. Therefore, when image data with a different resolution from that of the printer section is transmitted from an external device, the need for changing the image-formation speed of the printer section is eliminated. This allows degradation in image quality due to changes in density or the like derived from switching of the image-formation speed to be prevented.

Further, the data converting unit has a smoothing processing unit for subjecting the image data read out from the storing unit to smoothing processing. This data converting unit changes the contents of the smoothing processing according to a number of times of repeatedly reading out an identical line and/or an identical pixel of the image data stored in the storing unit. Therefore, jaggies can effectively be corrected.

Further, the resolution setting unit can discretely set each degree of zoom in the main scanning direction and auxiliary scanning direction. Therefore, it is also possible to convert resolution of the image data which has a different resolution in the main scanning direction and in the auxiliary scanning direction to the resolution of the printer section.

Further, the resolution setting unit can selectively set resolution out of a plurality types of setting. Therefore, it is possible to suitably use this invention for image data having various resolution sent from external device.

Further, the line-synchronizing signal thinning unit thins out the line-synchronizing signal to 1/n when resolution in the auxiliary scanning direction of image data transmitted from an external device is 1/n of that of the printer section and transmits the signal to the external device as a thinned line-synchronizing signal. Therefore, it is possible to easily change the resolution in the auxiliary scanning direction.

Further, resolution in the zoom setting unit is set according to a command transmitted from the external device or the printer section. Therefore, a user does not have to change the resolution each time which allows some work and time for operations to be reduced.

Further, the external device is a FAX. Therefore, it is possible to convert image data transmitted from a FAX to a resolution appropriated to a printer section.

Further, the image forming apparatus comprises the interface device described above and a printer section for printing and outputting image data transmitted from the interface device. Therefore, it is possible to provide an image forming apparatus which can handle image data having various resolutions without any changing the image-formation speed of the printer section.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An interface device which executes signal processing to image data received from an external device and transmits the processed data to a printer section, said device comprising:

a line-synchronizing signal thinning means for thinning out a line-synchronizing signal received from said printer section at a prespecified cycle according to pre-set resolution, and transmitting the signal to said external device as a thinned line-synchronizing signal;

a resolution setting means for setting resolution;

a storing means for storing therein image data received from said external device at a cycle of the thinned line-synchronizing signal;

a data converting means for repeatedly reading out an identical line and/or an identical pixel of the image data stored in said storing means according to the pre-set resolution, and transmitting the read out data to said printer section.

2. The interface device according to claim 1, wherein said data converting means further comprises a smoothing processing means for smoothing the image data read out from said storing means, and the contents of the smoothing is changed according to a number of times of repeatedly reading out an identical line and/or an identical pixel of the image data stored in said storing means.

3. The interface device according to claim 1, wherein said resolution setting means can discretely set the resolution in the main and auxiliary scanning directions.

4. The interface device according to claim 1, wherein said resolution setting means can selectively set a resolution out of a plurality of setting.

5. The interface device according to claim 1, wherein said line-synchronizing signal thinning means thins out the line-synchronizing signal to 1/n when the resolution in the auxiliary scanning direction of the image data transmitted from said external device is 1/n (n: a natural number) of that of said printer section, and transmits the signal to said external device as thinned line-synchronizing signal.

6. The interface device according to claim 1; wherein resolution in said resolution setting means is set according to a command transmitted from said external device or said printer section.

7. The interface device according to claim 1, wherein said external device is a facsimile machine.

8. An image forming apparatus comprising:
   an interface device and a printer section which prints an image data received from an external device, said interface device having,
      a line-synchronizing signal thinning means for thinning out a line-synchronizing signal received from said printer section at a prespecified cycle according to pre-set resolution, and transmitting the signal to said external device as a thinned line-synchronizing signal;
      a resolution setting means for setting resolution;
      a storing means for storing therein image data received from said external device at a cycle of the thinned line-synchronizing signal;
      a data converting means for repeatedly reading out an identical line and/or an identical pixel of the image data stored in said storing means according to the pre-set resolution, and transmitting the read out data to said printer section.

9. An interface device which executes signal processing to image data received from an external device and transmits the processed data to a printer section, said device comprising:
   a line-synchronizing signal thinning unit which thinns out a line-synchronizing signal received from said printer section at a prespecified cycle according to pre-set resolution, and transmitting the signal to said external device as a thinned line-synchronizing signal;
   a resolution setting unit which sets resolution;
   a storing unit which stores therein image data received from said external device at a cycle of the thinned line-synchronizing signal;
   a data converter which repeatedly reads out an identical line and/or an identical pixel of the image data stored in said storing unit according to the pre-set resolution, and transmitting the read out data to said printer section.

10. The interface device according to claim 9, wherein said data converter further comprises a smoothing processer which smoothes the image data read out from said storing unit, and the contents of the smoothing is changed according to a number of times of repeatedly reading out an identical line and/or an identical pixel of the image data stored in said storing unit.

11. The interface device according to claim 9, wherein said resolution setting unit can discretely set the resolution in the main and auxiliary scanning directions.

12. The interface device according to claim 9, wherein said resolution setting unit can selectively set a resolution out of a plurality of setting.

13. The interface device according to claim 9, wherein said line-synchronizing signal thinning unit thins out the line-synchronizing signal to 1/n when the resolution in the auxiliary scanning direction of the image data transmitted from said external device is 1/n (n: a natural number) of that of said printer section, and transmits the signal to said external device as thinned line-synchronizing signal.

14. The interface device according to claim 9; wherein resolution in said resolution setting unit is set according to a command transmitted from said external device or said printer section.

15. The interface device according to claim 9, wherein said external device is a facsimile machine.

16. An image forming apparatus comprising:
   an interface device and a printer section which prints an image data received from an external device, said interface device having,
      a line-synchronizing signal thinning unit which thinns out a line-synchronizing signal received from said printer section at a prespecified cycle according to pre-set resolution, and transmitting the signal to said external device as a thinned line-synchronizing signal;
      a resolution setting unit which sets resolution;
      a storing unit which stores therein image data received from said external device at a cycle of the thinned line-synchronizing signal;
      a data converter which repeatedly reads out an identical line and/or an identical pixel of the image data stored in said storing unit according to the pre-set resolution, and transmitting the read out data to said printer section.

* * * * *